(12) United States Patent
Hoang et al.

(10) Patent No.: US 11,320,062 B2
(45) Date of Patent: May 3, 2022

(54) APPARATUS, SYSTEMS, AND METHODS FOR CONTROLLING VALVE ACTUATION SPEED

(71) Applicant: CAMERON INTERNATIONAL CORPORATION, Houston, TX (US)

(72) Inventors: Loc G. Hoang, Houston, TX (US); Margaret Anne Maciejko, Katy, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 16/562,008

(22) Filed: Sep. 5, 2019

(65) Prior Publication Data

US 2021/0071776 A1 Mar. 11, 2021

(51) Int. Cl.
*F16K 31/122* (2006.01)
*F16K 3/02* (2006.01)

(52) U.S. Cl.
CPC ........ *F16K 31/1221* (2013.01); *F16K 3/0254* (2013.01)

(58) Field of Classification Search
CPC . F16K 3/0254; F16K 31/1221; F16K 31/0686
USPC ........................................................ 251/62
See application file for complete search history.

(56) References Cited

U.S. PATENT DOCUMENTS

| 2,707,484 | A | | 5/1955 | Rush | |
|---|---|---|---|---|---|
| 3,155,365 | A | * | 11/1964 | Hartung | F16K 21/16 251/25 |
| 3,226,078 | A | * | 12/1965 | Anderson | F16K 31/122 251/62 |
| 4,407,329 | A | * | 10/1983 | Huebsch | E21B 34/066 137/629 |
| 6,854,705 | B2 | * | 2/2005 | Wieder | F16K 31/122 251/62 |
| 9,671,034 | B2 | * | 6/2017 | Graichen | F16K 3/0254 |
| 2014/0197345 | A1 | | 7/2014 | Graichen et al. | |
| 2016/0052184 | A1 | | 2/2016 | Galati et al. | |

OTHER PUBLICATIONS

The Extended Search Report issued in EP Application 20194420.4, dated Dec. 22, 2020 (9 pages).

* cited by examiner

*Primary Examiner* — Umashankar Venkatesan
(74) *Attorney, Agent, or Firm* — Helene Raybaud

(57) ABSTRACT

A valve actuator for a valve is disclosed, including an actuator housing with a reciprocation axis and a piston configured to reciprocate within the actuator housing along the reciprocation axis. The actuator housing has a port and a chamber disposed between the piston and a portion of the actuator housing with the port for fluid communication with the port of a working fluid. A piston projection or piston recess in the chamber is moveable with the piston to reduce a flow area in the chamber that causes a reduction in speed of the piston prior to reaching a stop position.

18 Claims, 6 Drawing Sheets

APPARATUS, SYSTEMS, AND METHODS FOR CONTROLLING VALVE ACTUATION SPEED

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to high-speed movement in valves as the valves open or close. More particularly, it relates to apparatus, systems, and methods for governing the movement in a valve to minimize abrupt stopping of valve components.

Valves are located and configured to control a flow of fluid through a conduit. Valves are coupled into the conduit and include various forms of obstruction to block the fluid flow through the conduit that passes through the valve. The obstruction may be moveable to regulate and manage the amount of fluid that passes through the valve. Various obstructions may include a gate, a knife, a piston, or other blocking members, and may be powered by an actuator. One type of actuator is a linear actuator. Opening and closing of the valve obstruction, particularly at high speeds, can cause internal components of the valve to contact each other and result in damage. It is sometimes desirable to slow down the actuation speed of the internal, moveable components of the valve such as the obstruction member and the actuator before these components reach a full stop. A mechanical or electrical control system may be used to slow down these components before full stop contact is achieved.

BRIEF SUMMARY OF THE DISCLOSURE

In some embodiments, a valve actuator includes an actuator housing with a reciprocation axis and a piston configured to reciprocate within the actuator housing along the reciprocation axis. The actuator housing has a port and a chamber disposed between the piston and a portion of the actuator housing with the port for fluid communication with the port of a working fluid. A piston projection or piston recess in the chamber is moveable with the piston to reduce a flow area in the chamber that causes a reduction in speed of the piston prior to reaching a stop position. The projection may be extendable into the port. The projection may be extendable into a second port in the chamber. The recess may be a reduced diameter portion of the piston. The port may intersect the chamber perpendicular to the reciprocation axis.

In some embodiments, a valve for stopping and starting the flow of a process fluid includes a valve housing including a flow passage, a gate configured to slide within the housing to open or close the flow passage, and an actuator configured to use a working fluid. The actuator may include an actuator housing having a reciprocation axis, a piston configured to move within the actuator housing along the reciprocation axis, a chamber disposed between the piston and a portion of the actuator housing, a port in the actuator housing for working fluid communication with the chamber, a variable flow area through which the working fluid flows when passing between the chamber and the port when the piston moves, and a projection or recess on the piston configured to reduce the variable flow area as the piston moves toward a stop position, and configured to allow fluid communication through the reduced variable flow area in the stop position. The port may have a flow area, and the reduced variable flow area may be less than the port flow area. The piston may include a sidewall having a cylindrical portion and a frustoconical portion axially adjacent the cylindrical portion. The projection may be a plug coupled to the piston for continuous movement with the piston. The projection may be a plug coupled to the actuator housing and configured for intermittent movement with the piston. The plug may include a tapered body, and wherein the plug is configured so that the tapered body extends into the port as the plug moves.

In some embodiments, a valve for stopping and starting the flow of a process fluid includes a valve housing including a flow passage, a gate configured to slide within the housing to open or close the flow passage, and an actuator configured to use a working fluid. The actuator may include an actuator housing having a reciprocation axis, a piston configured to reciprocate within the actuator housing along the reciprocation axis, a chamber disposed between the piston and a portion of the actuator housing, a port in the actuator housing for working fluid communication with the chamber, a variable flow area through which the working fluid flows when flowing in the chamber when the piston reciprocates, and a plug configured to move in the chamber and extend into the port to reduce the variable flow area as the piston moves toward a stop position. The port may have a flow area, and the reduced variable flow area may be less than the port flow area. The plug may be coupled to the piston for continuous reciprocation with the piston. The plug may be coupled to the actuator housing and configured for intermittent reciprocation with the piston. The reduction in the variable flow area may cause a reduction in speed of the piston prior to the plug extending into the port, and the extension of the plug into the port may further reduce the speed of the piston.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings, wherein.

NOTATION AND NOMENCLATURE

Figure 1:
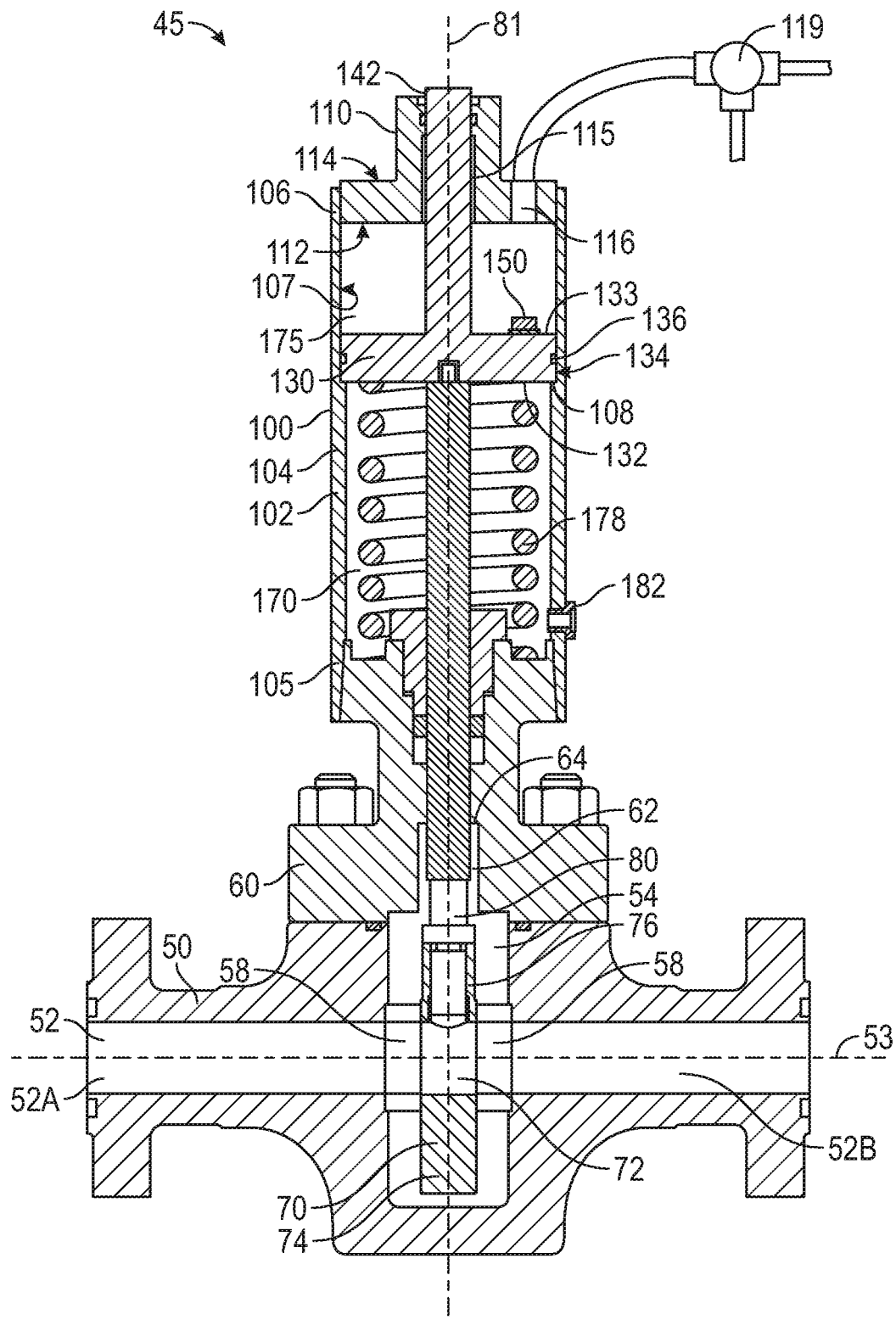
FIG. 1 shows a cross-sectional elevation view of an embodiment of a gate valve having a fluid-controlled actuator in accordance with principles described herein, wherein the valve is in an open condition.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the following definitions and ideas will apply:

The terms "including" and "comprising," as well as derivations of these, are used in an open-ended fashion, and thus should be interpreted to mean "including, but not limited to . . . " Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and any number of other factors. The word "or" is used in an inclusive manner. For example, "A or B" means any of the following: "A" alone, "B" alone, or both "A" and "B."

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upward," "down," "lower," "clockwise," "left," "leftward," "right" "right-hand," "down", and "lower." For example, a relative direction or a relative position of an object or feature may pertain to the orientation as shown in a figure or as described. If the object or feature were viewed from another orientation or were implemented in another orientation, it may be appropriate to describe the direction or position using an alternate term.

DETAILED DESCRIPTION OF THE DISCLOSED EXEMPLARY EMBODIMENTS

This disclosure presents various embodiments of an actuator configured to control the opening and closing speeds of various valves before the valve comes to a fully stopped position. Exemplary valves include gate valves, ball valves, and hydraulic piston valves. In the disclosed embodiments, the actuator may include a piston or other drive member driven in at least one direction by a working fluid. The actuator includes a fluid flow area that is configured, during operation of the valve, to restrict the fluid flow area through which the working fluid flows. The restriction causes the speed at which the working fluid exits from the actuator to be lessened or slowed, thereby causing the piston or other drive member to be slowed.

Referring to FIG. 1, in an exemplary embodiment, a valve 45 includes a valve housing 50, a bonnet 60, a gate 70 positioned within housing 50, a flow passage 52, a valve stem 80 extending from gate 70 into bonnet 50, a pair of valve seats 58, and a valve actuator 100. Flow passage 52 extends through housing 50 along a flow axis 53 from an entry zone 52A to an exit zone 52B and expands into a chamber 54 within the central region of housing 50, between zones 52A, 52B. Valve seats 58 are located in chamber 54, having flow passages centered on axis 53. Bonnet 60 is coupled to housing 50 and includes a through-bore 62 that intersects the chamber 54 and a downward facing shoulder or stop 64 that limits the upward travel of stem 80 and the attached gate 70. As noted above, the valve 45 can take different forms such as a gate valve, a ball valve, or a hydraulic piston valve, among other valves, though a gate valve is used for illustrative purposes in this description.

Gate 70 is held between valve seats 58 and includes a through-passage 72, a blocking portion 74, and a stem coupling portion 76 that couples to valve stem 80. Valve stem 80 extends from gate 70 through bonnet 60 along an actuation axis 81. In FIG. 1, axis 81 is perpendicular to axis 53. Valve 45 is configured so that reciprocal movement of valve stem 80 along axis 81 slides gate 70 so that through-passage 72 and blocking portion 74 are alternately positioned between valve seats 58, respectively allowing fluid communication through the length of flow passage 52 or inhibiting fluid communication through the passage 52. During at least some positions of gate 70, chamber 54 is in fluid communication with entry zone 52A, exit zone 52B, or both zones 52B so that fluid pressure from passage 52 is exerted within chamber 54 during a portion of the reciprocation cycle of gate 70. FIG. 1 shows valve 45 and gate 70 in the open position, having through-passage 72 aligned with flow passage 52. In the closed position, gate 70 is raised so that portion 74 blocks flow passage 52. Valve 45 and gate 70 include intermediate positions that can be referred to as partially open or partially closed.

Valve actuator 100 includes an actuator housing 102 extending away from bonnet 60 along the shared axis 81, a fluid port 116, a piston 130 configured for reciprocation within housing 102, and a plug or obstruction 150 configured to reciprocate as a result of the reciprocation of the piston and configured to variably block or obstruct port 116.

Housing 102 includes tubular wall 104 that extends from a proximal end 105 adjacent bonnet 60 to a distal end 106 with an inner surface 107. Housing 102 also includes a cap 110 at distal end 106. A shoulder 108 is positioned along surface 107 between ends 105, 106, facing the end 106 such that inner surface 107 has a larger diameter at distal end 106. In this embodiment, proximal end 105 is directly attached to an upper end of bonnet 60 and shoulder 108 is closer to housing end 106 than to housing end 105. Cap 110 seals the distal end 106 of wall 104, forming a head portion of housing 102. Cap 110 includes an internal end surface 112, an external end surface 114 separated from surface 112 along axis 81, and a through-hole 115 extending through the surfaces 112, 114 and centered on axis 81. Alternatively, the upward travel of stem 80 and gate 70 can be stopped or limited by surface 112 rather than or in addition to shoulder.

Continuing to reference FIG. 1, piston 130 is cylindrical and extends along an axis 81 from a proximal end 132 to a distal end 133 and includes a sidewall 134 slidingly engaged with surface 107 of housing 102. Piston 130 is configured for reciprocation between shoulder 108 and cap 110 at end 106. A seal 136 surrounds and is seated within piston sidewall 134 and, consequently, also slidingly engages wall 104. Piston 130 is rigidly coupled to valve stem 80 at piston end 132, and a second stem 142 is rigidly coupled to the opposite end 133 and extends through hole 115 in cap 110. In other embodiments, stems 80, 142 are a single piece or member that connects to piston 130.

The location of piston 130 within housing 102 defines two chambers 170, 175 having variable volumes. A proximal chamber 170 is located between bonnet 60 and piston proximal end 132. A distal chamber 175 is located between piston distal end 133 and cap internal surface 112. A resilient member, which in this embodiment is a compression spring 178, is disposed within chamber 170 extending between bonnet 60 and piston 130 to bias piston 130 away from valve body 50, which biases gate 70 to the closed position. A vent 182 provides fluid communication into chamber 170 to allow air, ambient fluid, or another fluid to enter and exit as piston 130 moves. Vent 182 extends through wall 104.

Figure 2:
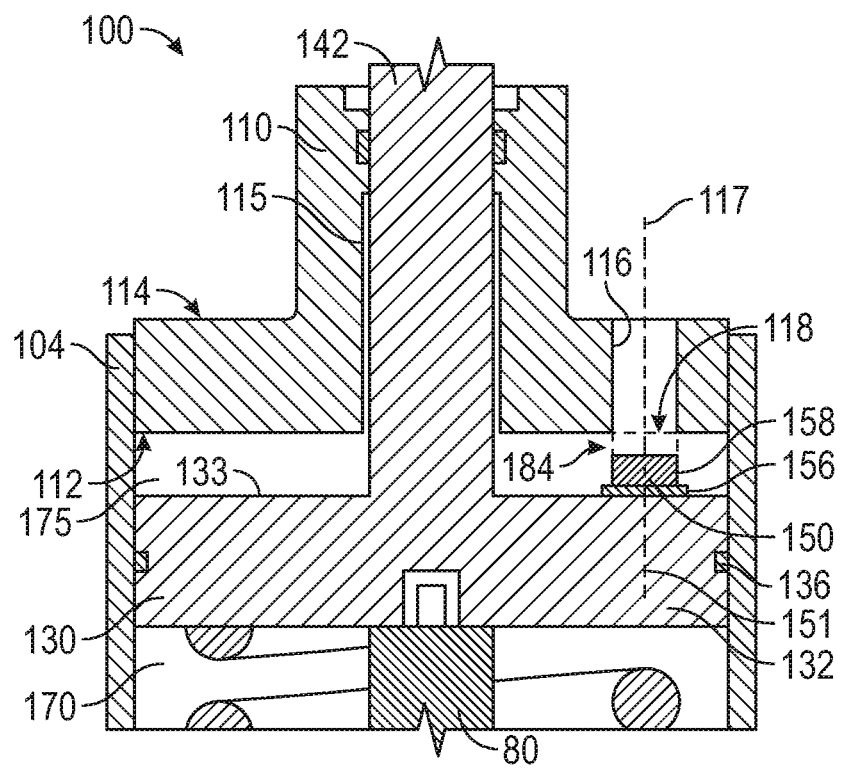
FIG. 2 shows an enlarged view of the actuator of the valve of FIG. 1 while the actuator is in a partially closed condition.

Port 116 extends through the surfaces 112, 114 of cap 110 along a port axis 117 parallel to actuation axis 81. In other embodiments, port 116 and port axis 117 are offset from or not parallel to actuation axis 81. As best shown in FIG. 2, port 116 has an inner flow area 118 extending perpendicular to port axis 117 adjacent surface 112. Plug 150 of actuator 100 is attached to piston 130 and includes a head 156 and a body 158 that extend along a plug axis 151 aligned with port axis 117. In at least this embodiment port 116, head 156, and body 158 are cylindrical, centered on axis 151, 117.

Referring again to FIG. 1, port 116 provides fluid communication into distal chamber 175 for a control fluid to enter chamber 175. In some embodiments, the control fluid is pressurized to push piston 130 toward valve body 50, opening valve gate 70. A three-port control valve 119 supplied by a source of pressurized fluid governs the flow of fluid into port 116. In other embodiments, the control valve 119 is a two-by-two port valve or other control valves known in the industry. To hold gate 70 open, control valve 119 remains closed, keeping fluid within chamber 175. Port area 118 provides a fluid flow path for the control fluid to leave chamber 175 when an operator or a control system decides that valve 45 needs to close, switching valve 119 to exhaust the fluid to a reservoir. With valve 119 exhausting the control fluid, the closing of valve 45, i.e., the upward movement of gate 70 along axis 81, is driven by the pressure of the process fluid in flow passage 52 including chamber 54 and in gate passage 72. Stem 80 pushes piston 130 in the same direction, and piston 130 drives the control fluid from chamber 175 along the fluid flow path of port area 118, thereby shrinking or making smaller chamber 175. The upward movement of gate 70 is also driven by spring 178 pushing on piston 130 and stem 80.

Referring again to FIG. 2, a cylindrical fluid flow area 184 can be defined that extends vertically from the circumference of plug 150 to the circumference of port 116. Fluid leaving chamber 175 first travels through fluid flow area 184 or the volume that it defines, and then the exiting fluid flows through fluid flow area 118 of port 116. The relative fluid flow areas between fluid flow area 184 and port flow area 118 will determine the speed or volumetric flow rate of fluid leaving port 116. In other words, whichever of the flow areas 184, 118 is smaller than the other will dictate the speed or the volumetric flow rate of fluid leaving port 116.

Figure 3:
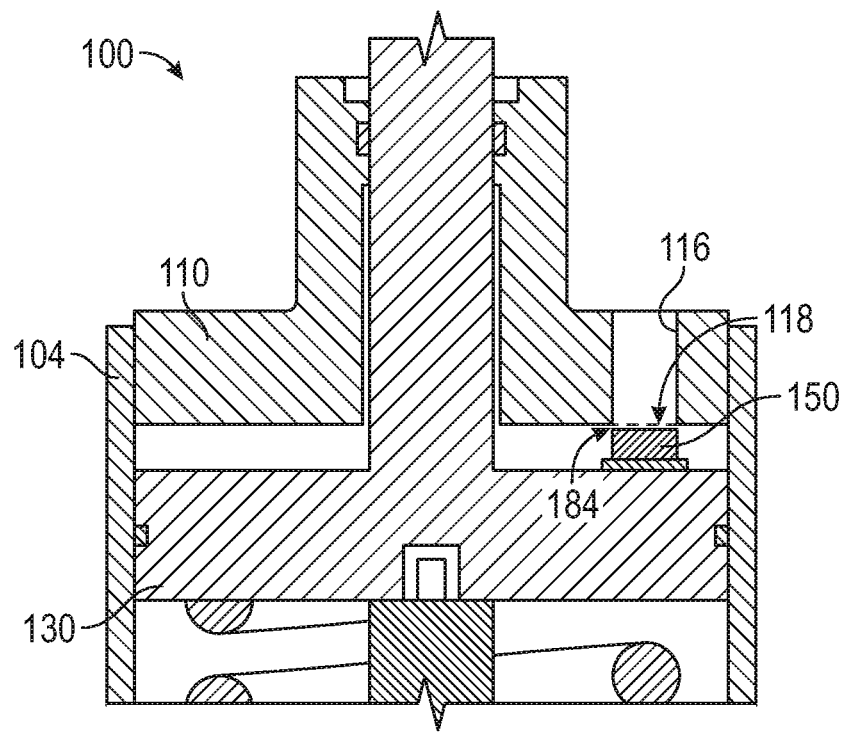
FIG. 3 shows an enlarged view of the actuator of the valve of FIG. 1 while the actuator is in a nearly-closed condition.
Figure 4:
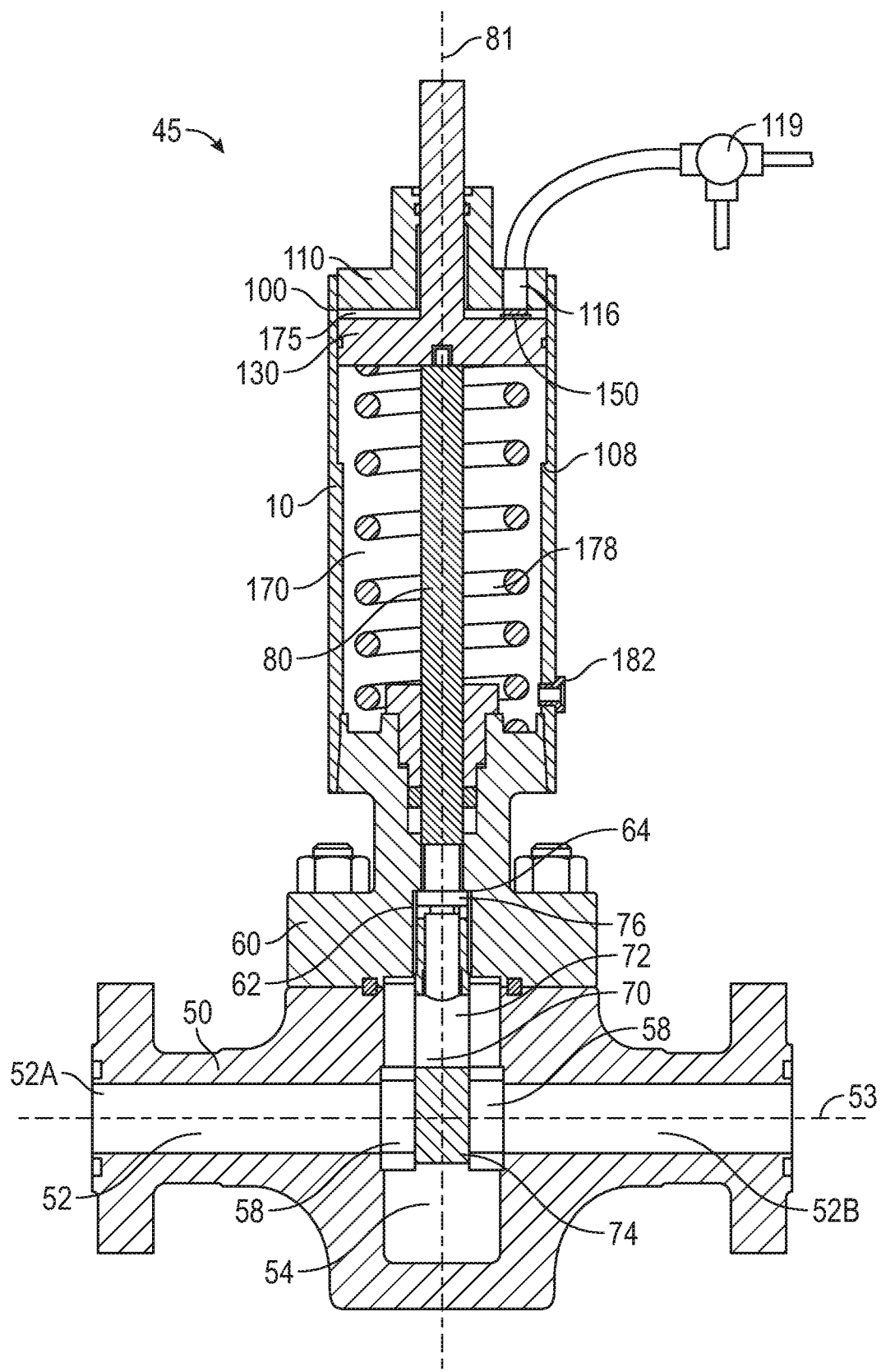
FIG. 4 shows the valve of FIG. 1 in a closed condition.

In certain embodiments, initially, port flow area 118 is smaller than cylindrical flow area 184, as shown in the valve open condition of FIG. 1. But as piston 130 rises, flow area 184 becomes smaller than port flow area 118, as shown in the successive piston 130 positions of FIGS. 2 and 3, thereby restricting the flow of fluid into port 116. First, the restriction of shrinking flow area 184 increases the velocity of fluid passing through that area. Then, the continuing shrinking of flow area 184 reduces the volumetric flow rate of fluid entering port 116, which slows the speed of piston 130. For example, FIG. 3 shows plug 150 and its top or upper surface very close to port 116 so that flow area 184 is much smaller than port flow area 118. Thus, the upward movement of piston 130 and plug 150 reduces a flow area through which fluid from chamber 175 passes to reach port 116 as it exits chamber 175. By the time piston 130 has reached its top-dead-center location, plug 150 blocks port 116 entirely or nearly entirely. In some embodiments, as shown in FIG. 4, plug 150 extends into port 116, extending through the port flow area 118.

The blockage of port 116 and resulting stoppage of fluid flow first slows and ultimately stops the upward movement of piston 130. In some embodiments, the stoppage of piston 130 is augmented by a trapped portion of the working fluid held within a residual pocket of chamber 175. Furthermore, the stop-shoulder 64 in bonnet 60 and a shoulder on stem 80 may assist or cause the stopping of piston 130, stem 80, and gate 70. In some embodiments, other movement limiting features in valve 45 may assist with stopping piston 130. With actuator 100, the stopping of piston 130, stem 80, and gate 70 is smoother or less abrupt than if port 116 was not variably restricted, or no fluid was trapped. In this manner, the fluid flow path along the areas 184, 118 is variable or adjustable such that the volumetric flow rate along this flow path is correspondingly variable or adjustable to provide fluid dampening of the speed of piston 130.

The opening of valve 45 is driven by working fluid pushing on plug 150 and eventually pushing on piston 130. In some embodiments, plug 150 does not entirely restrict port 116 when the valve is closed. Rather, plug 150 leaves a clearance for fluid flow when seated within port 116. The clearance provides a path for returning fluid to immediately pressurize both plug 150 and piston 130, providing a greater initial force due to the larger, combined surface area that promptly experiences the renewed pressure.

Figure 5:
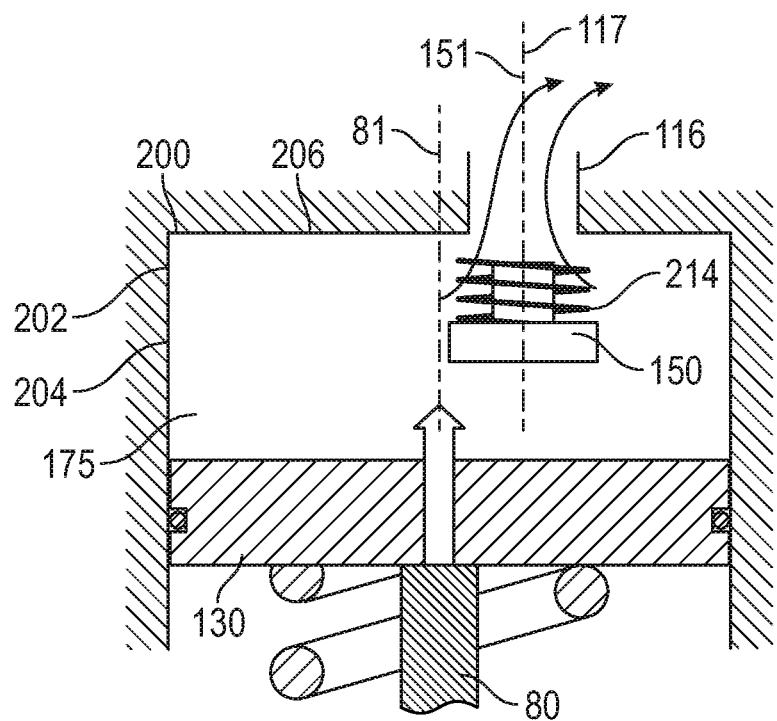
FIG. 5 shows an enlarged view of another embodiment of an actuator compatible with the valve of FIG. 1, wherein the actuator is in an open condition.

The partial view of FIG. 5 presents another embodiment, namely, a valve actuator 200. Various embodiments of valve actuator 200 are compatible with valve 45 (FIG. 1) to replace actuator 100. Valve actuator 200 includes an actuation axis 81, a housing 202, a port 116 in housing 202, a piston 130, and a plug 150.

Housing 202 includes a side wall 204, a head portion 206, and the port 116 extending through head portion 206 parallel to axis 81 (or non-parallel in some embodiments). Piston 130 is disposed within housing 202 and configured for reciprocation. Piston 130 is coupled to a valve stem 80 as previously described regarding valve 45 and actuator 100. Piston 130 lacks a second stem 142 extending opposite valve stem 80 and head portion 206 lacks a through-hole 115 (FIG. 1), but other embodiments of actuator 200 include a second stem and a cap 110 like those of actuator 100. Plug 150 is mounted or coupled adjacent port 116 and is biased away from port 116 by a spring 214 or another resilient or biasing member. Plug 150 is mounted or coupled independently of piston 130. In some embodiments, plug 150 is mounted by a stem or other elongate member that extends to head portion 206 or through port 116. Plug 150 is configured to reciprocate with piston 130 when piston 130 is adjacent port 116 and presses against plug 150. The movement of plug 150 with respect to port 116 is parallel to axis 81 and is the same or similar to the movement described above (including not being parallel in some embodiments). A variable volume chamber 175 is formed between piston 130, sidewall 204, and head portion 206. Chamber 175 is in fluid communication with port 116, dependent on the position of plug 150. The movement of piston 130 or plug 150 toward or into port 116 reduces at least one flow area that feeds exiting fluid to port 116. In this manner, piston 130 or plug 150 reduces or stops fluid communication from chamber 175 to port 116, thereby reducing or dampening the speed of piston 130.

Figure 6:
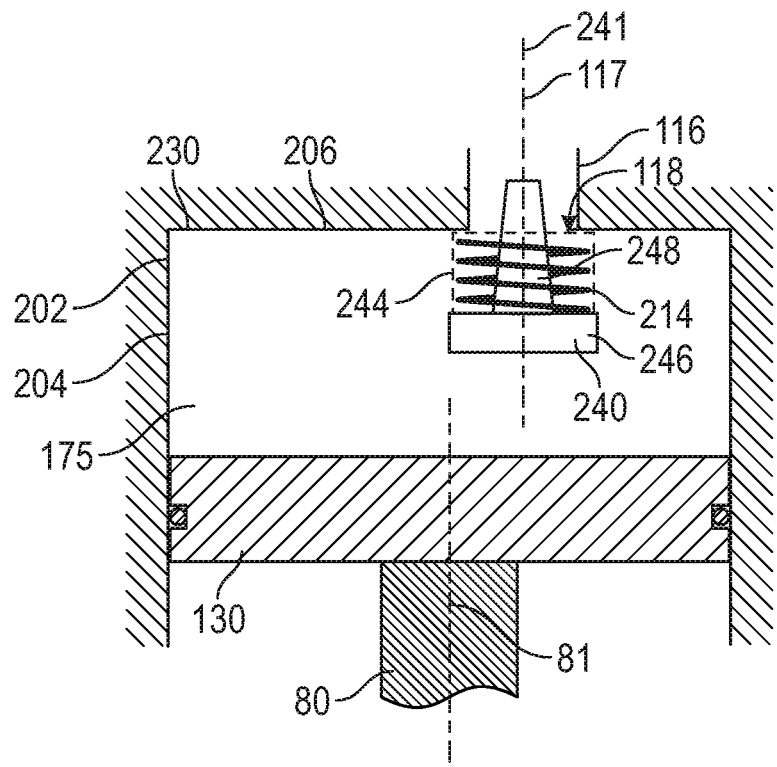
FIG. 6 shows an enlarged view of still another embodiment of an actuator compatible with the valve of FIG. 1, wherein the actuator is in an open condition.

The partial view of FIG. 6 presents a third embodiment, namely, a valve actuator 230. Various embodiments of valve actuator 230 are compatible with valve 45 (FIG. 1) to replace actuator 100. Like actuator 200, valve actuator 230 includes an actuation axis 81, a housing 202, a fluid port 116 in housing 202 and a piston 130. Valve 230 also includes a conical or frustoconical plug 240.

Housing 202 includes a side wall 204, a head portion 206, and the port 116 extending through head portion 206 parallel to axis 81 (or non-parallel in some embodiments). Piston 130 is disposed within housing 202 and configured for reciprocation along axis 81. Piston 130 is coupled to a valve stem 80 as previously described. Plug 240 includes a cylindrical head 246 and a frustoconical body 248 that extend along a plug axis 241 centered with port 116. Body 248 tapers in diameter as it extends away from head 246 and toward or into port 116, and to the mounting mechanism in head portion 206 or further into port 116 (not shown). Plug 240 is mounted adjacent port 116 and is biased away from port 116 by a spring 214 or another resilient member. Plug 240 is mounted independently of piston 130. Plug 240 is configured to reciprocate with piston 130 when piston 130 is adjacent port 116 and presses against plug 240. The movement of plug 240 with respect to port 116 is parallel, or non-parallel, to axis 81 and is the same or similar to the movement described above for plugs 150. A variable volume chamber 175 is formed between piston 130, sidewall 204, and head portion 206. Chamber 175 is in fluid communication with port 116, dependent on the position of plug 240. As described above regarding area 184 in FIG. 2 and FIG. 3, similarly, a flow area 244 extending between the perimeter of plug 240 and head portion 206 is reduced as plug 240 moves upward in FIG. 6. Flow area 244 is located within chamber 175 and surrounds port area 118. For convenience, flow area 244 may be considered to be cylindrical; although, any area between plug 240 and head portion 206 may be used. As shown in FIG. 6, frustoconical body 248 is partially extends into port 116 and blocks a portion of flow area 118 even before piston 130 contacts or pushes plug 240. When piston 130 pushes plug upward, body 248 blocks more and more of area 118, also reducing this area. Eventually, plug 240 reaches its uppermost position, and head 246 contacts head portion 206 and may block entirely the flow area 118. Thus, like the embodiments described above, the movement of piston 130 or plug 240 toward or into port 116 reduces a flow area that feeds exiting fluid to port 116. More specifically, similar to the previous embodiments, the areas 244, 118 are each reduced by the movement of piston 130 or plug 240. In this manner, plug 240 is configured to reduce or stop fluid communication from chamber 175 to port 116, thereby reducing or dampening the speed of piston 130. In some embodiments of valve actuator 230, flow area 118 is not entirely blocked when plug 240 is in its uppermost position. In some embodiments, during a portion of the cycle of actuator 130, all of plug 240 is offset downward from area port 118, and no portion of plug 240 blocks area 118 until piston 130 pushes plug 240 into area 118.

Figure 7:
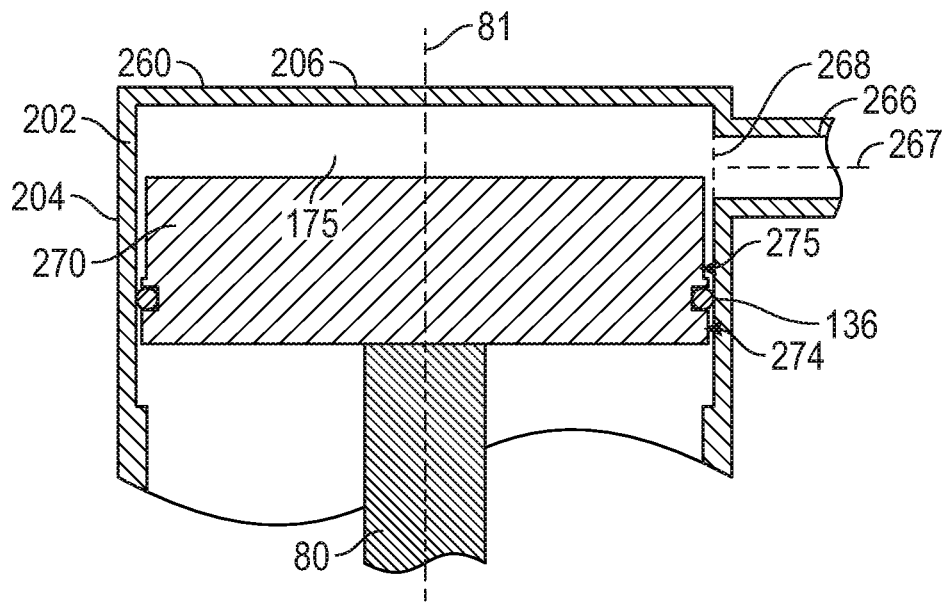
FIG. 7 shows an enlarged view of yet another embodiment of an actuator compatible with the valve of FIG. 1, wherein the actuator is shown in a partially closed condition.

FIG. 7 presents a fourth embodiment, namely, a valve actuator 260. Various embodiments of valve actuator 260 are compatible with valve 45 to replace actuator 100. Like various embodiments described above, valve actuator 260 includes an actuation axis 81, a housing 202, and a piston 270. Actuator 260 also includes a fluid port 266 in housing 202, but port 266 is oriented differently than the port 116 described above. In the embodiment shown, actuator 260 lacks a plug to restrict flow into fluid port 266.

Housing 202 includes a side wall 204, a head portion 206, and the port 266 extending through side wall 204 along a port axis 267 that is not parallel to axis 81. In FIG. 7, port axis 267 is perpendicular or generally tangential to axis 81. Actuator 260 also includes a piston 270 that serves a similar purpose to piston 130 and is disposed within housing 202 and configured for reciprocation along axis 81. Piston 270 includes a side wall comprising two portions. A lower, cylindrical sidewall portion 274, and an upper, cylindrical sidewall portion 275 extends from portion 314 toward head portion 206. Lower portion 314 slidingly engages housing sidewall 204 along with an embedded seal 136. Upper portion 275 has a smaller diameter than lower portion 274. Piston 130 at lower portion 314 is coupled to a valve stem 80 located opposite head portion 206. A variable volume chamber 175 is formed between piston 130, sidewall 204, and head portion 206. Chamber 175 is in fluid communication with port 266 through an inner flow area 268 extending generally perpendicular to port axis 267, adjacent the inner surface of sidewall 204. The extent of fluid communication between chamber 175 and port 266 depends on the position of piston 130. Like the embodiments described above, while piston 130 moves upward, toward head portion 206, it reduces a flow area through which fluid from chamber 175 passes to reach port 266. This reducing of flow area eventually reduces the volumetric flow rate of control fluid exiting chamber 175 through port 266. The gradual blockage of port 266 and decline in volumetric flow rate slows and may ultimately stop the upward movement of piston 130. By the time that piston 130 reaches its top-dead-center location, piston upper portion 275 faces a portion, a majority, or all of the port area 268. Due to the smaller diameter of piston upper portion 275, port 266 continues to have fluid communication with chamber 175 above piston 270 even when piston 130 reaches its top-dead-center. This state of continued fluid communication while piston 270 is at top-dead-center facilitates the reentry of working fluid into chamber 175 when an operator or a machine controller decides to push piston 270 down, as may be done to re-open a gate 70 that may be attached to piston 270 via stem 80, for example.

Figure 8:
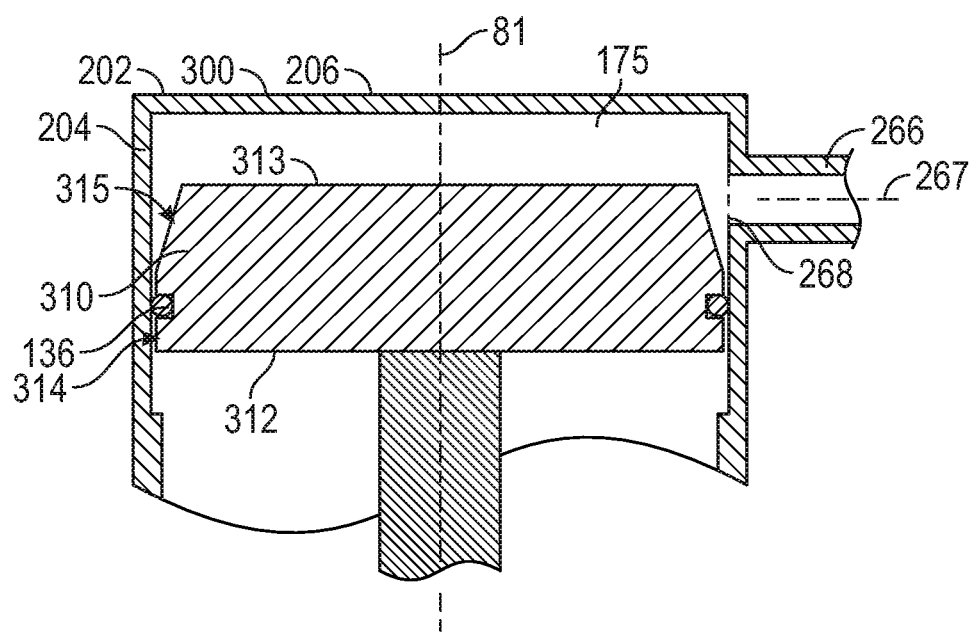
FIG. 8 shows an enlarged view of a further embodiment of an actuator compatible with the valve of FIG. 1, wherein the actuator is shown in a partially closed condition.

FIG. 8 presents another embodiment, namely, a valve actuator 300. Various embodiments of valve actuator 300 are compatible with valve 45 to replace actuator 100. Like actuator 260, valve actuator 300 includes an actuation axis 81, a housing 202, and port 266 extending through housing sidewall 204 along a port axis 267 that is not parallel to axis 81. Actuator 300 also includes a piston 310 that serves a similar purpose to piston 130. In the embodiment shown, actuator 300 lacks a plug to restrict flow into fluid port 266.

Piston 310 extends along an axis 81 from a proximal end 312 (proximal relative to the location where bonnet 60 and valve body 50 would be attached) to a distal end 313 and includes a side wall comprising two portions. A lower, cylindrical sidewall portion 314 starts at end 312, and an upper, frustoconical sidewall portion 315 extends from portion 314 to distal end 313. Cylindrical portion 314 slidingly engages housing sidewall 204 along with an embedded seal 136. Piston 310 is disposed within housing 202 and configured for reciprocation along axis 81. Piston 310 is coupled to a valve stem 80 located opposite head portion 206 of housing 202. A variable volume chamber 175 is formed between piston 310, sidewall 204, and head portion 206. Chamber 175 is in fluid communication with port 266 through an inner flow area 268 extending generally perpendicular to port axis 267, adjacent the inner surface of sidewall 204. The extent of fluid communication between chamber 175 and port 266 depends on the position of piston 310. While piston 310 moves upward, toward head portion 206, frustoconical portion 315 reduces a flow area through which fluid from chamber 175 passes to reach port 266. The reducing of flow area eventually reduces the volumetric flow rate of control fluid exiting chamber 175 through port 266. The gradual blockage of port 266 and decline in volumetric flow rate slows the upward movement of piston 310. In at least some embodiments, cylindrical portion 314 blocks some portion of port flow area 268 as piston 310 travels toward head portion 206. When piston 310 comes to a stop adjacent head portion 206, frustoconical portion 315 faces at least a portion of flow area 268 so that the recess allows fluid communication between chamber 175 and port 266, and fluid communication is not entirely blocked. Even while piston 310 is at its top-dead-center location, this state of continued fluid communication exists between chamber 175 and port 266 due to the tapered side of frustoconical portion 315. This state of continued fluid communication at top-dead-center facilitates the reentry of working fluid into chamber 175 when an operator or a machine controller decides to push piston 310 down.

Figure 9:
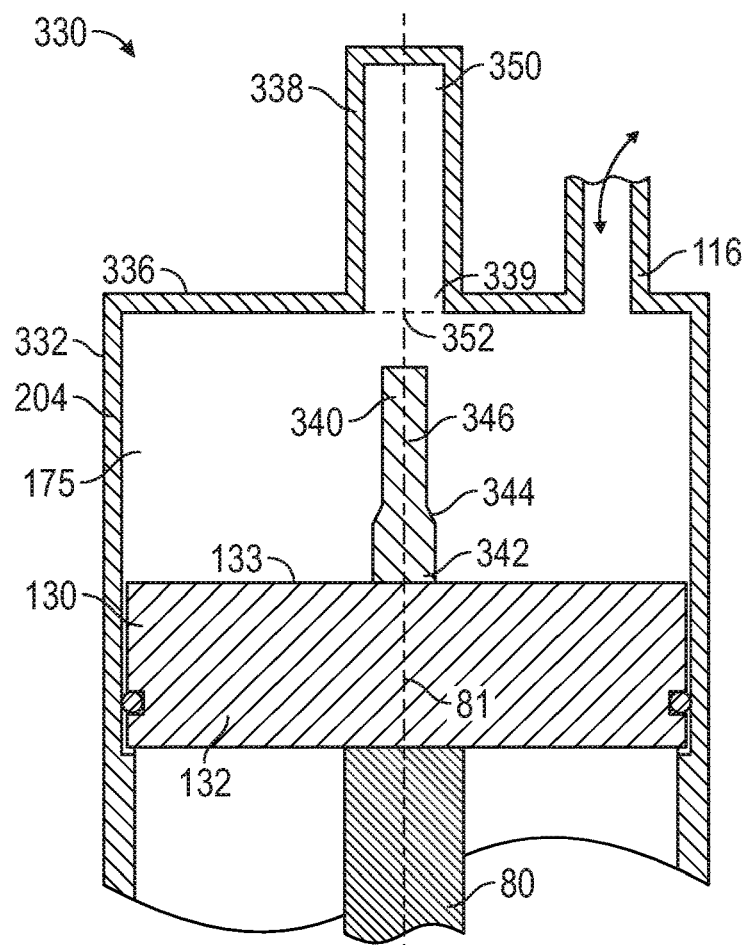
FIG. 9 shows an enlarged view of an additional embodiment of an actuator compatible with the valve of FIG. 1, wherein the actuator is shown in an open condition.

FIG. 9 presents another embodiment, namely, a valve actuator 330. Various embodiments of valve actuator 330 are compatible with valve 45 to replace actuator 100. Valve actuator 330 includes an actuation axis 81, a housing 332, a port 116 in housing 332, a piston 130, and a second stem 340.

Housing 332 includes a side wall 204, a head portion 336, and the port 116 extending through head portion 336, and a pocket structure or pocket 338 extending upward from portion 336. Pocket 338 includes an inlet port 339 at proximal end and port 339 has a selected port diameter. Piston 130 is disposed within housing 332 and configured for reciprocation. A valve stem 80 is coupled to the proximal end 132 of piston 130 as previously described regarding valve 45 and actuator 100. The second stem 340 is coupled to the distal end 133 of piston 130 and is aligned to reciprocate into and out from pocket 338. Stem 340 includes a lower portion 342 extending from piston 130, a tapered, central portion 344, extending from portion 342, and an upper portion 346 extending from central portion 344.

Figure 10:
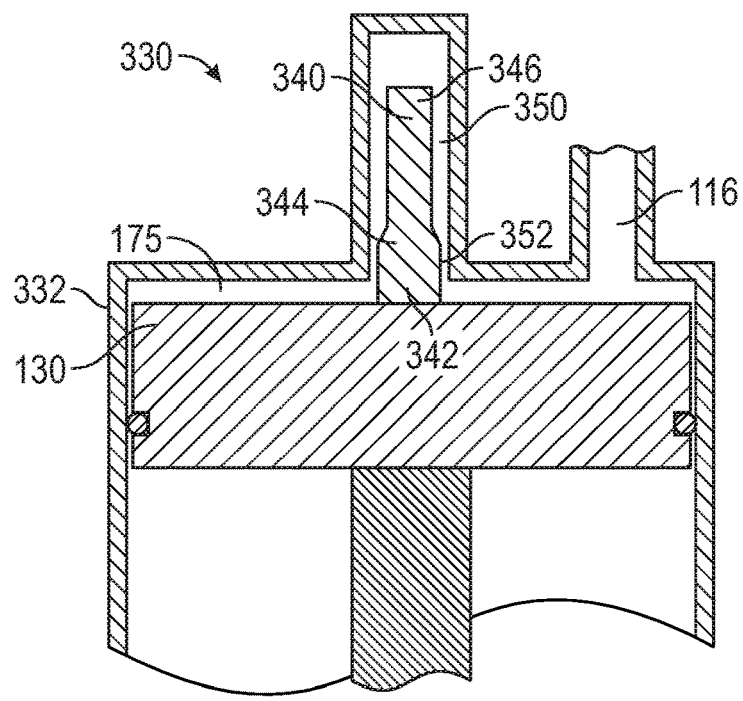
FIG. 10 shows the actuator of FIG. 9 in a closed position.

A variable volume chamber 175 is formed between piston 130, sidewall 204, and head portion 336. Chamber 175 is in fluid communication with port 116 and port 339 to provide or remove working fluid. A second chamber 350 extends within pocket 338. Chamber 350 and chamber 175 are in fluid communication through port 339, which includes a flow area 352 that extends across port 339. In this exemplary embodiment, area 352 is flush with the inner surface of head portion 336. The volume of chamber 350 varies depending on the amount of stem 340 that is positioned within pocket 338 as piston 130 reciprocates. As best shown in FIG. 10, the diameter of the lower portion 342 of stem 340 is sized so as to be receivable within port 339 of pocket 338 while providing an annular flow area that allows, but restricts flow between pocket 338 and chamber 175. Portions 344 and 342 have smaller diameters than lower portion 342. Referring again to FIG. 9, the movement of piston 130 and stem 340 toward head portion 336 and pocket 338 drives fluid out through port 116. As stem 340 reaches and enters pocket 338, some fluid in chamber 350 is forced to enter chamber 175 and drives fluid out through port 116. In addition, the sequential movement of stem portions 346, 344, 342 into pocket 338 increasingly reduces the flow area 352. Lower portion 342 creates the largest restriction to area 352. The reductions of area 352 restrict the flow of fluid from chamber 350 to clamber 175, creating a force against stem 340, slowing the movement of piston 130, and reducing the flow rate of fluid exiting through port 116. The slowing movement of piston 130 would slow the movement of a valve gate coupled to valve stem 80.

Examples of various embodiments have been expressly presented. Multiple additional variations and uses are possible in accordance with principles described herein. Additional embodiments may share compatible characteristics of one or more of the previously-described embodiments or those described below.

Although the various plugs 150, 240 were described as being configured to close fully an exit port 116 and to stop the fluid communication between a chamber and port 116, in some embodiments, a portion of a flow area continues to provide fluid communication between a chamber and port 116 even after the selected plug is fully seated against port 116. The flow areas selected for discussion of the various embodiments are representative of many different flow areas that could be analyzed with similar conclusions. While the embodiments of FIGS. 1-4 include a second stem 142 on piston 130 extending opposite valve stem 80, and the embodiments of FIG. 5 to FIG. 8 were shown without a second stem 142, various other embodiments based on any of the previously disclosed embodiments may either include or lack a second stem coupled for motion with the actuator as described above regarding second stem 142. valve actuator 330 of FIG. 9 is not intended to be fabricated without a second stem 340. While some embodiments disclosed above were shown with a spring 178 biasing the piston upward and a coupled gate toward the open position and other embodiments were shown without such a resilient member, various other embodiments based on any of the previously disclosed embodiments may either include or lack a resilient member configured for biasing the positions of the piston and a gate. Some embodiments may combine multiple flow restrictions from two or more of the described embodiments to restrict flow of the working fluid in an actuator and slow the speed of the piston.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, components, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A valve actuator comprising:
    an actuator housing with a reciprocation axis;
    a piston having a first central axis along the reciprocation axis, wherein the piston is configured to reciprocate within the actuator housing along the reciprocation axis;
    a port in the actuator housing;
    a chamber disposed between the piston and a portion of the actuator housing with the port for fluid communication with the port of a working fluid;
    a projection having a second central axis radially offset from the first central axis of the piston, wherein the projection is disposed in the chamber, wherein the projection is coupled to the piston in a fixed position such that the projection is moveable directly with the piston to reduce a flow area in the chamber that causes a reduction in speed of the piston prior to reaching a stop position; and
    wherein the port is configured to supply the working fluid to the chamber to move the piston in a first direction, the port is configured to discharge the working fluid from the chamber to move the piston in a second direction opposite from the first direction, and the projection is configured to restrict the port as the piston moves in the second direction toward the stop position.

2. The valve actuator of claim 1, wherein the projection is extendable into the port.

3. The valve actuator of claim 1, wherein the projection is coaxial with the port.

4. The valve actuator of claim 1, comprising a valve stem coupled to the piston along the first central axis, wherein the valve stem extends through a central bore in a cover of the actuator housing, and the port is disposed in the cover.

5. The valve actuator of claim 1, wherein the projection comprises a plug configured to plug the port as the piston moves toward the stop position.

6. A valve for stopping and starting the flow of a process fluid, the valve comprising:
    a valve housing including a flow passage;
    a gate configured to slide within the housing to open or close the flow passage;
    an actuator configured to use a working fluid, the actuator including:
        an actuator housing having a reciprocation axis;
        a piston configured to move within the actuator housing along the reciprocation axis;
        a chamber disposed between the piston and a portion of the actuator housing;
        a port in the actuator housing for working fluid communication with the chamber;
        a variable flow area through which the working fluid flows when passing between the chamber and the port when the piston moves;
        a projection having a first central axis aligned with a second central axis of the port, wherein the projection is not biased by a spring, and the projection is configured to reduce the variable flow area as the piston moves toward a stop position; and
    wherein the port is configured to supply the working fluid to the chamber to move the piston in a first direction, the port is configured to discharge the working fluid from the chamber to move the piston in a second direction opposite from the first direction, and the projection is configured to restrict the port as the piston moves in the second direction toward the stop position.

7. The valve of claim 6, wherein the projection is extendable coaxially into the port.

8. The valve of claim 6, wherein the first central axis of the projection is radially offset from a third central axis of the piston.

9. The valve of claim 6, wherein the projection is coupled to the piston in a fixed position such that the projection is moveable directly with the piston.

10. The valve of claim 9, wherein the projection is coupled to and protrudes from an axial end face of the piston.

11. The valve of claim 6, wherein the port has a port flow area, and the reduced variable flow area is less than the port flow area.

12. The valve of claim 6, wherein the projection comprises a plug configured to plug the port as the piston moves toward the stop position.

13. The valve of claim 6, wherein the projection includes a tapered body, and wherein the projection is configured so that the tapered body extends into the port as the projection moves.

14. A valve for stopping and starting the flow of a process fluid, the valve comprising:
    a valve housing including a flow passage;
    a gate configured to slide within the housing to open or close the flow passage;
    an actuator configured to use a working fluid, the actuator including:
        an actuator housing having a reciprocation axis;
        a piston configured to reciprocate within the actuator housing along the reciprocation axis;
        a chamber disposed between the piston and a portion of the actuator housing;
        a port in the actuator housing for working fluid communication with the chamber;
        a variable flow area through which the working fluid flows when flowing in the chamber when the piston reciprocates;
        a plug coupled to and protruding from an axial end face of the piston, wherein the plug is configured to move with the piston in the chamber and extend into the port to reduce the variable flow area as the piston moves toward a stop position; and
    wherein the port is configured to supply the working fluid to the chamber to move the piston in a first direction, the port is configured to discharge the working fluid from the chamber to move the piston in a second direction opposite from the first direction.

15. The valve of claim 14, wherein the port has a port flow area, and the reduced variable flow area is less than the port flow area.

16. The valve of claim 14, wherein the plug is coupled to the piston in a fixed position such that the plug is moveable directly with the piston.

17. The valve of claim 14, wherein the plug is not biased by a spring.

18. The valve of claim 14, wherein the reduction in the variable flow area causes a reduction in speed of the piston prior to the plug extending into the port, and the extension of the plug into the port further reduces the speed of the piston.

* * * * *